United States Patent [19]

Smiltneek

[11] Patent Number: 4,659,147

[45] Date of Patent: Apr. 21, 1987

[54] DUMP TRAILER

[76] Inventor: Ralmond J. Smiltneek, 12906 W. Fairmount Ave., Butler, Wis. 53007

[21] Appl. No.: 794,050

[22] Filed: Nov. 1, 1985

[51] Int. Cl.⁴ .............................................. B60P 1/12
[52] U.S. Cl. ...................................... 298/20 R; 298/5
[58] Field of Search ................... 298/17.5, 17 R, 20 R, 298/5, 15; 414/434, 435, 436, 484

[56] References Cited

U.S. PATENT DOCUMENTS

| | | | |
|---|---|---|---|
| 218,999 | 8/1879 | Mills et al. | 298/5 |
| 2,057,833 | 10/1936 | Jungersen | 298/17.5 X |
| 2,566,556 | 9/1951 | Cunningham | 298/20 R |
| 2,765,193 | 10/1956 | McGrew | 298/20 R |
| 3,053,572 | 9/1962 | Harper | 298/5 |
| 3,066,983 | 12/1962 | Bay | 298/5 |
| 3,111,346 | 11/1963 | Harbers et al. | 298/17.5 X |
| 3,692,362 | 9/1972 | Craske | 298/5 |
| 3,833,263 | 9/1974 | Jackson | 298/5 |
| 3,858,939 | 1/1975 | Bond et al. | 298/20 R |
| 4,068,892 | 1/1978 | Welch | 298/17 R |
| 4,392,687 | 7/1983 | O'Connell | 298/5 |

FOREIGN PATENT DOCUMENTS 75296  1/1953  Denmark .......................... 298/20 R Primary Examiner—Robert J. Spar
Assistant Examiner—Janice Krizek
Attorney, Agent, or Firm—Fred Wiviott

[57] ABSTRACT

A dump trailer includes a frame attached below a trailer bed and having a first pair of parallel outer rails which are inclined upwardly from front to rear and a pair of center rails which are inclined downwardly from front to rear. A towing tongue extends along the center line of the frame and includes a forked end having a first pair of rollers engaging the first pair of rails and a second pair of rollers which engage the center rails. Pairs of wheels are disposed on each side of the bed and are mounted on the ends of leading and trailing arms pivotally mounted on the frame. A strut is adapted to be coupled to the arms at points above or below the wheel spindles for raising and lowering the bed relative to the wheels. The trailer is dumped by using a prime mover to force the tongue rearwardly thereby moving the rollers backwardly along their respective rails to pivot the frame and bed about the axis of the rear wheels. A brake actuated by the motion of the towing tongue locks the bed in its pivoted position until released.

21 Claims, 7 Drawing Figures

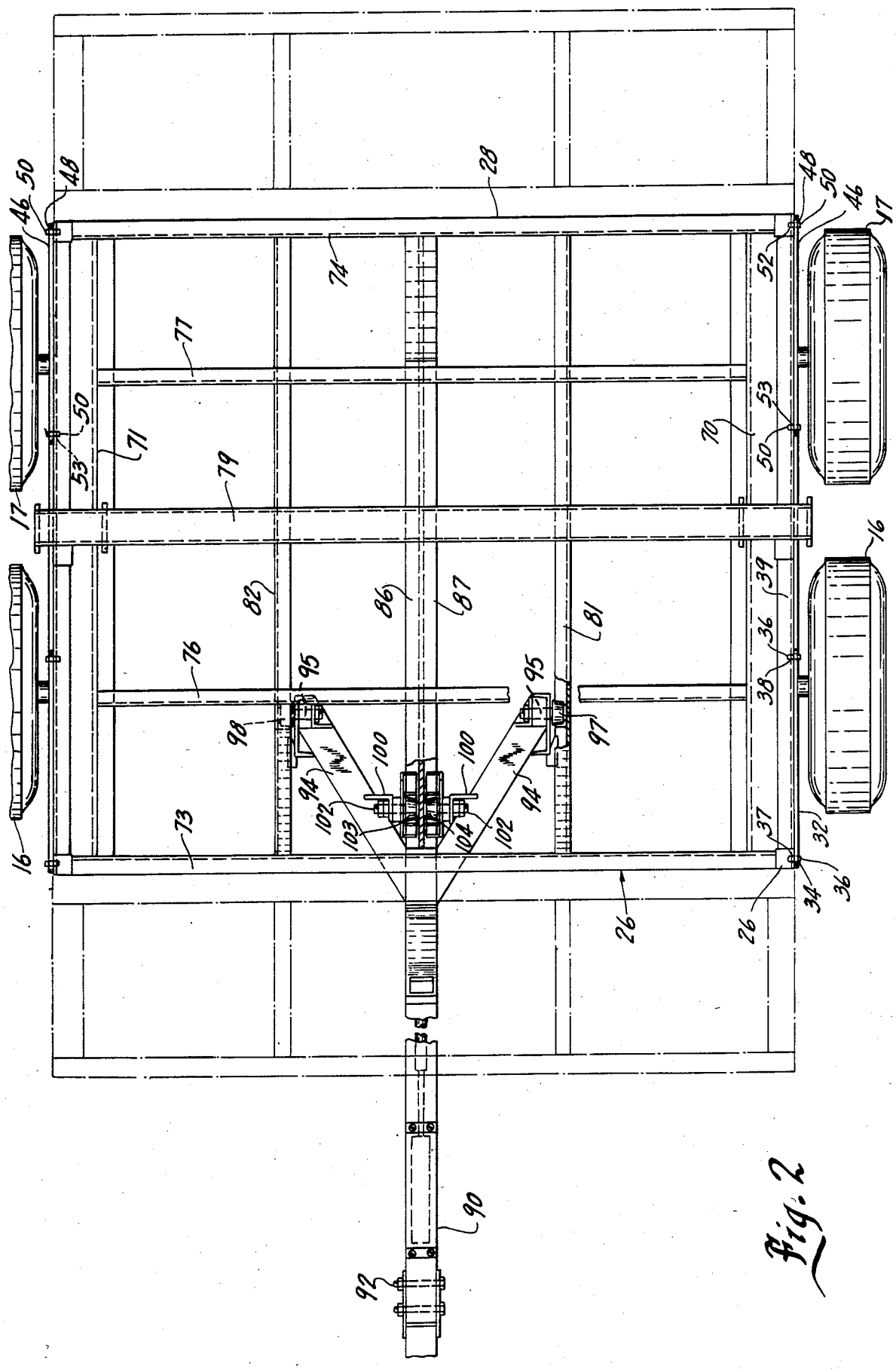

DUMP TRAILER

BACKGROUND OF THE INVENTION

This invention relates to trailers and more particularly to dump trailers.

Conventional dump trailers generally include a wheel mounted frame for supporting a pivotally mounted bed. Hydraulic or electrical devices such as hydraulic rams or winches are employed for tilting the frame relative to its support wheels or frame so that the contents of the bed may be discharged. Such trailers require not only power operated tilting mechanisms, but also the availability of some auxiliary source of hydraulic pressure or electrical energy.

SUMMARY OF THE INVENTION

It is an object of the invention to provide a new and improved dump trailer.

Another object of the invention is to provide a dump trailer which is actuated solely by motion of the prime mover to which it is attached.

A further object of the invention is to provide a dump trailer which does not require hydraulic or electrical energy to generate dumping forces.

A still further object of the invention is to provide a dump trailer which does not rely on gravity to generate load dumping forces.

It is a further object of the invention to provide a dump trailer in which the elevation of the trailer bed may be adjusted relative to the wheels.

Yet another object of the invention is to provide a dump trailer in which the bed can be held in its dumping mode without the requirement of an auxiliary outside power source.

It is yet another object of the invention to provide a dump trailer which effectively meters the discharge of material.

These and other objects and advantages of the present invention will become more apparent from the detailed description of the preferred embodiment taken with the accompanying drawings.

In general terms, the invention comprises a dump trailer having a trailer bed and a frame affixed below the bed. The frame has first track means which is inclined upwardly from front to rear and a second track means which is inclined downwardly from the front to rear when the frame means and the bed are in an untilted position. Wheel means are rotatively mounted on the frame for supporting the trailer. A towing tongue extends forwardly from the trailer and includes means adjacent its forward end for attachment to a prime mover. First and second roller means are mounted on the tongue and in spaced apart relation with the first roller means engaging the first track means and the second roller means engaging the second track means. The second roller means is at a higher elevation than the first roller means when the bed and frame are in their unpivoted position so that rearward movement of the tongue means when the wheel means are locked is operative to move the first roller means upwardly along the first track means and the second roller means downwardly along the second track means so that the frame and bed are tilted upwardly around the axis of the wheel means.

BRIEF DESCRIPTION OF THE DRAWINGS

FIG. 2 is a top plan view of the trailer shown in FIG. 1;

DETAILED DESCRIPTION OF THE PREFERRED EMBODIMENT

Figure 1:
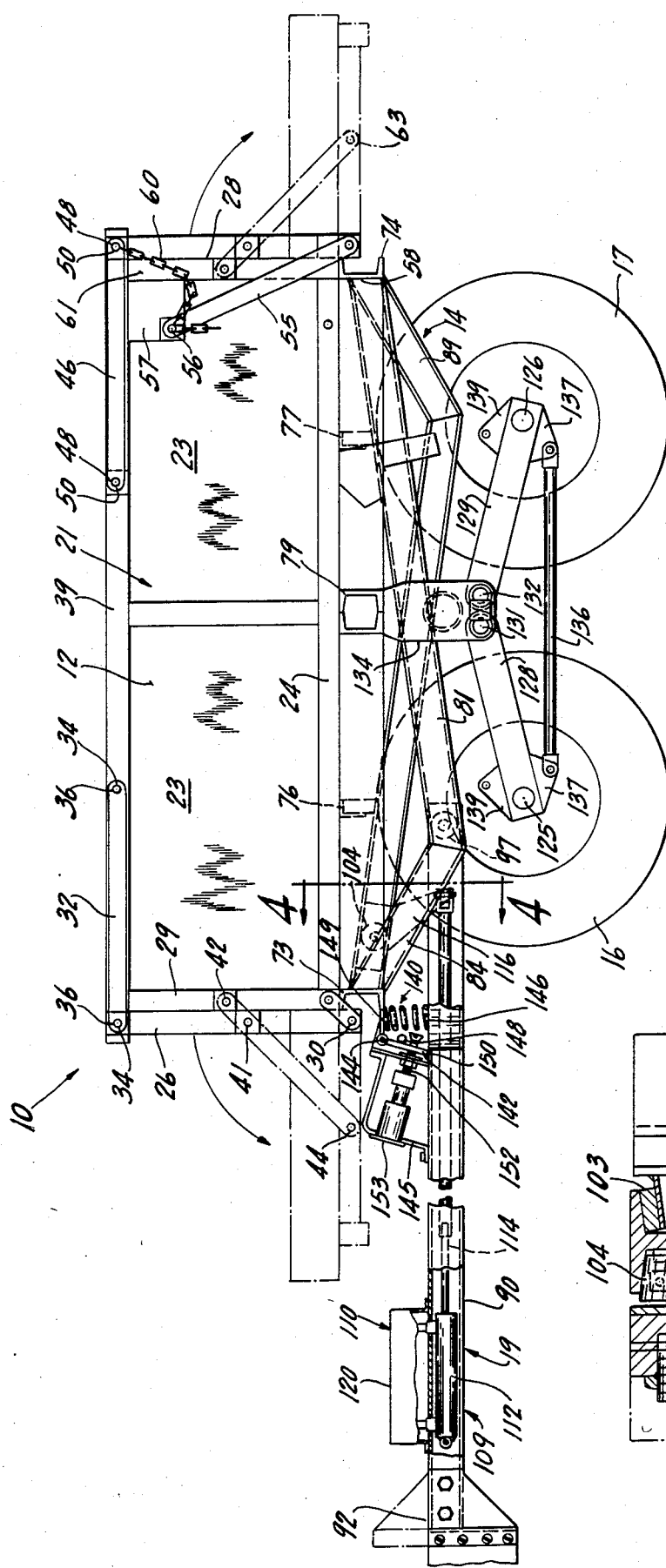
FIG. 1 is a side elevational view of the trailer in accordance with the preferred embodiment of the invention.
Figure 4:
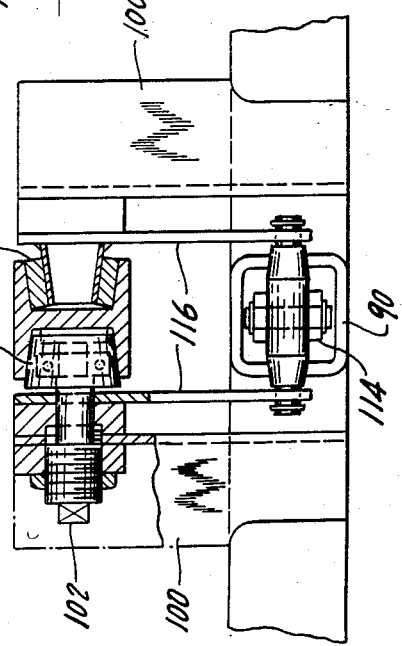
FIG. 4 is a view taken along lines 4—4 of FIG. 1.

The trailer 10 in accordance with the preferred embodiment of the invention is shown in FIGS. 1 and 2 to include a bed 12 mounted on a main frame 14 supported on pairs of wheels 16 and 17 disposed at each side. A tongue 19 couples the frame 14 to a prime mover (not shown) such as a tractor, for example, for transporting the trailer 10 and for transmitting the dumping force thereto as will be described more fully below.

The bed 12 includes an upper framework 21 suitably affixed to the main frame 14. Secured to the upper framework 21 are side panels 23 and a floor 24 formed of a suitable sheet metal. Also pivotally mounted on the upper framework is a front gate 26 and a rear gate 28.

Figure 3:
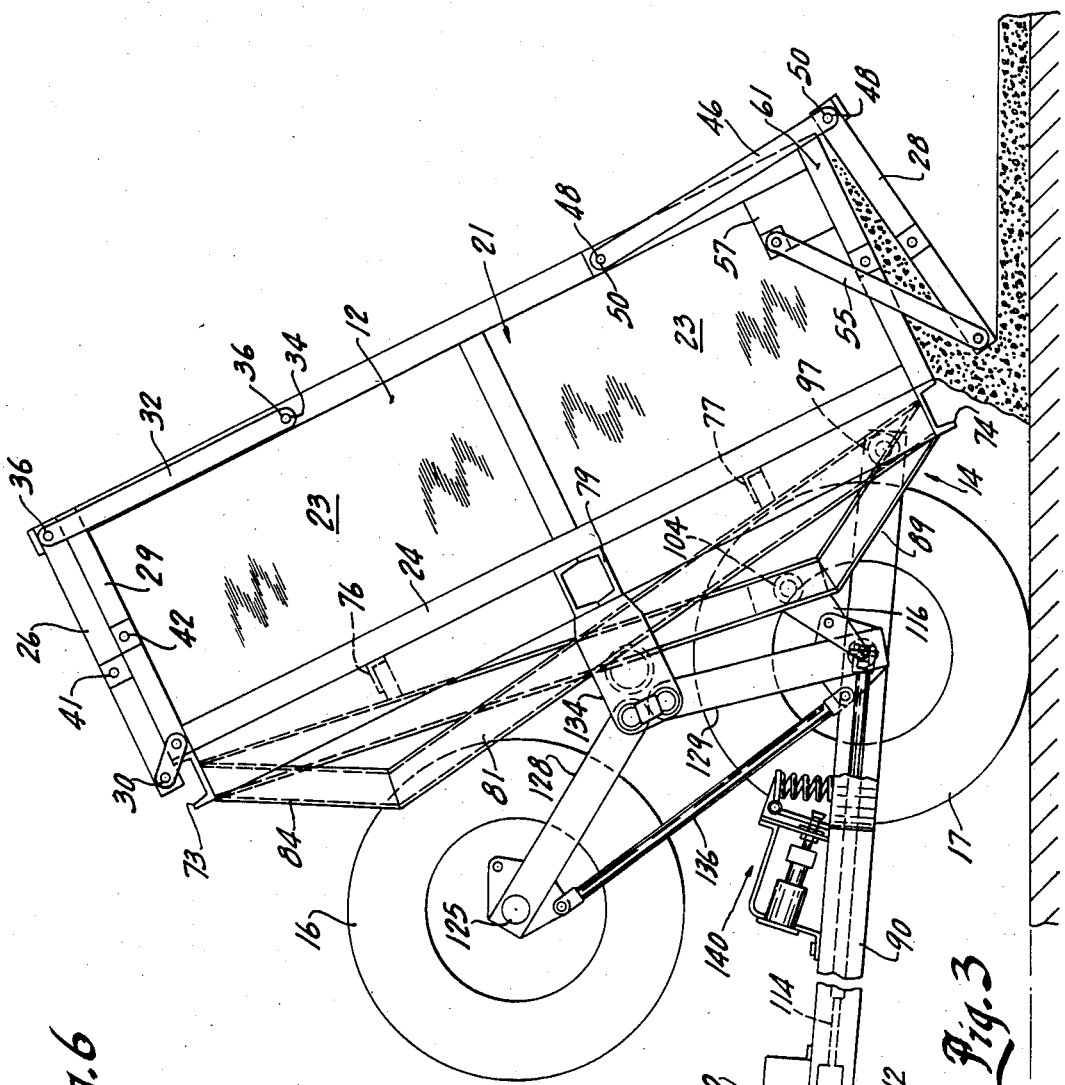
FIG. 3 shows the trailer of FIGS. 1 and 2 in its dumping mode.
Figure 6:
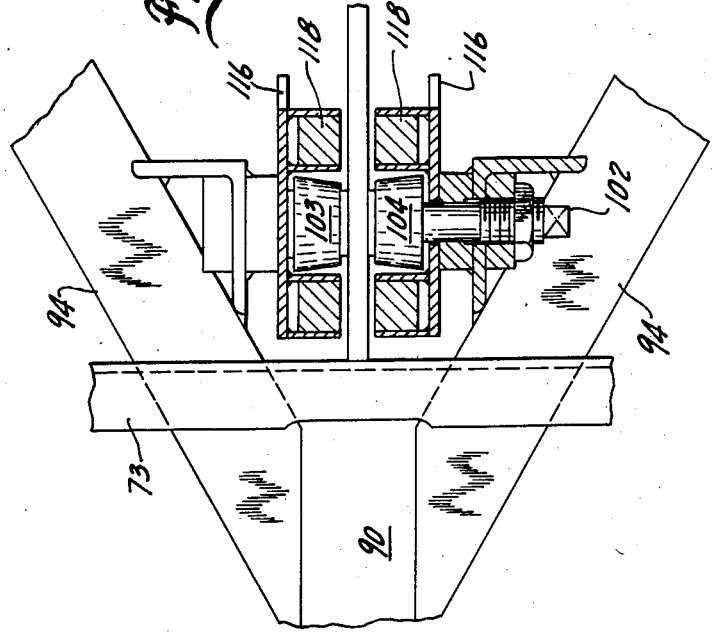
FIG. 6 is a view taken along lines 6—6 of FIG. 5.
Figure 5:
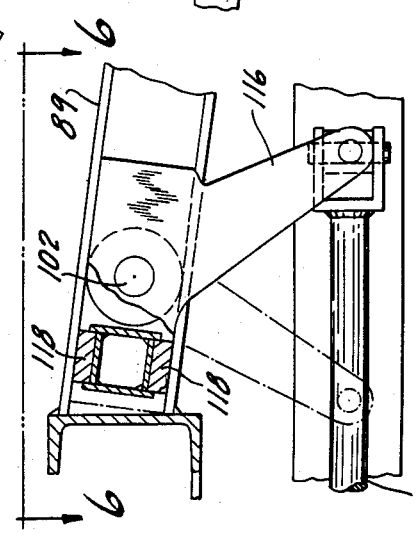
FIG. 5 is a side view of a portion of the device shown in FIG. 4.

As seen in FIG. 1, the front gate 26 is hinged at its lower end to the lower end of a vertical post 29 of the framework 21 by hinge pins 30. In addition, a constraining link 32 is provided at each side of the trailer for constraining the pivotal movement of the front gate 26 as it moves between its open and closed positions. In particular, each link 32 has a hole 34 in each end for receiving pins 36. In addition, corresponding apertures 37 and 38 are formed in the upper end of the front gate 26 and the horizontal upper member 39 of framework 21. The distances between the apertures 37 and 38 is equal to that between the holes 36 in members 32. When the members 32 are in the position shown by full lines in FIG. 1, the holes 34 will be in alignment with the apertures 37 and 38. Accordingly, when the pins 36 are inserted, the front gate 26 is constrained to pivot in a prescribed path as shown in FIG. 3. It can also be seen that there is a further aperture 42 formed intermediate the ends of the vertical frame member 29 and an additional opening 44 is provided in a center portion of the sides of gate 26. The links 32 can thus be used to support the gate 26 in its downwardly pivoted position as shown by broken lines in FIG. 1. The links 32 are placed in this position by first removing the pins 36, lowering the gate 26 to its horizontal position, aligning the openings 34 in links 32 into alignment with the openings 42 and 44 and reinserting the pins 36.

The rear gate 28 also includes constraining links 46 for coupling the upper end of the gate to the frame members 39 on the opposite sides of the bed 12 by means of removable pins 48 which are received in openings 50 in the opposite ends of links 46 and openings 52 and 53 in the upper end of gate 28 and the upper frame member 39. In addition, the lower end of gate 28 is pivotally connected to the lower ends of links 55, the upper ends of which are pivotally connected to plates 57 affixed to frame 21 at its upper rear corners. It will be appreciated that identical linkages are provided at the opposite side of the frame 21.

When the trailer 10 is pivoted as shown in FIG. 3, the lower end of the gate 28 will be free to pivot away from the bed 12 but this movement may be limited by an adjustable link chain 60 which extends between the framework 21 and the gate 28 for purposes which will be discussed in greater detail below. The rear gate 28 can also be supported in a downwardly pivoted position as shown by broken lines by removing the pins 48 and placing the links 46 in their position shown by broken lines wherein the openings 50 in their opposite ends are in alignment with the openings 52 in framework member 61 and openings 63 in the sides of gate 28.

As seen in FIGS. 1 and 2, the main frame 14 is formed of channel members suitably secured in a generally rectangular array and includes side members 70 and 71, front and rear members 73 and 74, cross members 76 and 77 and a transversely extending central box member 79. In addition, there is a first pair of parallel, spaced apart rails 81 and 82 formed of channel members and extending generally at an upward inclination relative to the horizontal and from front to rear. The forward ends of the rails 81 and 82 are supported below the main frame 14 by means of members 84 which extend downwardly and rearwardly from the member 73. The rearward end of rails 81 and 82 are fixed to the rear frame member 74.

There are, in addition, a second pair of rails 86 and 87 which extend below the center of the bed 12 and midway between the rails 81 and 82. The rails 86 and 87 are also formed of channel members affixed in a back-to-back relation and are angled generally in a downward inclination from the horizontal and from front to rear and at about the same angle as the rails 81 and 82. In particular, the forward ends of rails 86 and 87 are fixed to the front end member 73 and their opposite ends are fixed to a member 89 secured to rear member 74 and which extends downwardly and forwardly therefrom. As seen in FIG. 1, the rails 81 and 82 and 86 and 87 form a crossing pattern at about the midpoint of the bed 12.

The tongue 19 includes an elongate hollow beam 90 having a hitch 92 at one end for connection to the prime mover or tractor (not shown). At the opposite end there are a pair of rearwardly and outwardly extending arms 94. Attached to the end of each arm 94 is a spindle 95 for rotatably supporting a roller 97 or 98 which are respectively received in the tracks 81 and 82. In addition, there are a pair of vertically projecting arms 100 extending upwardly from the arms 94 adjacent their juncture with the box beam 90 and each arm 100 has a spindle 102 at its upper end for rotatably supporting rollers 103 or 104 which are received in the tracks 86 and 87, respectively. When the trailer 10 is in its unpivoted position as shown in FIG. 1, the rollers 103 and 104 are at a higher elevation and located forwardly of the rollers 97 and 98.

Figure 7:
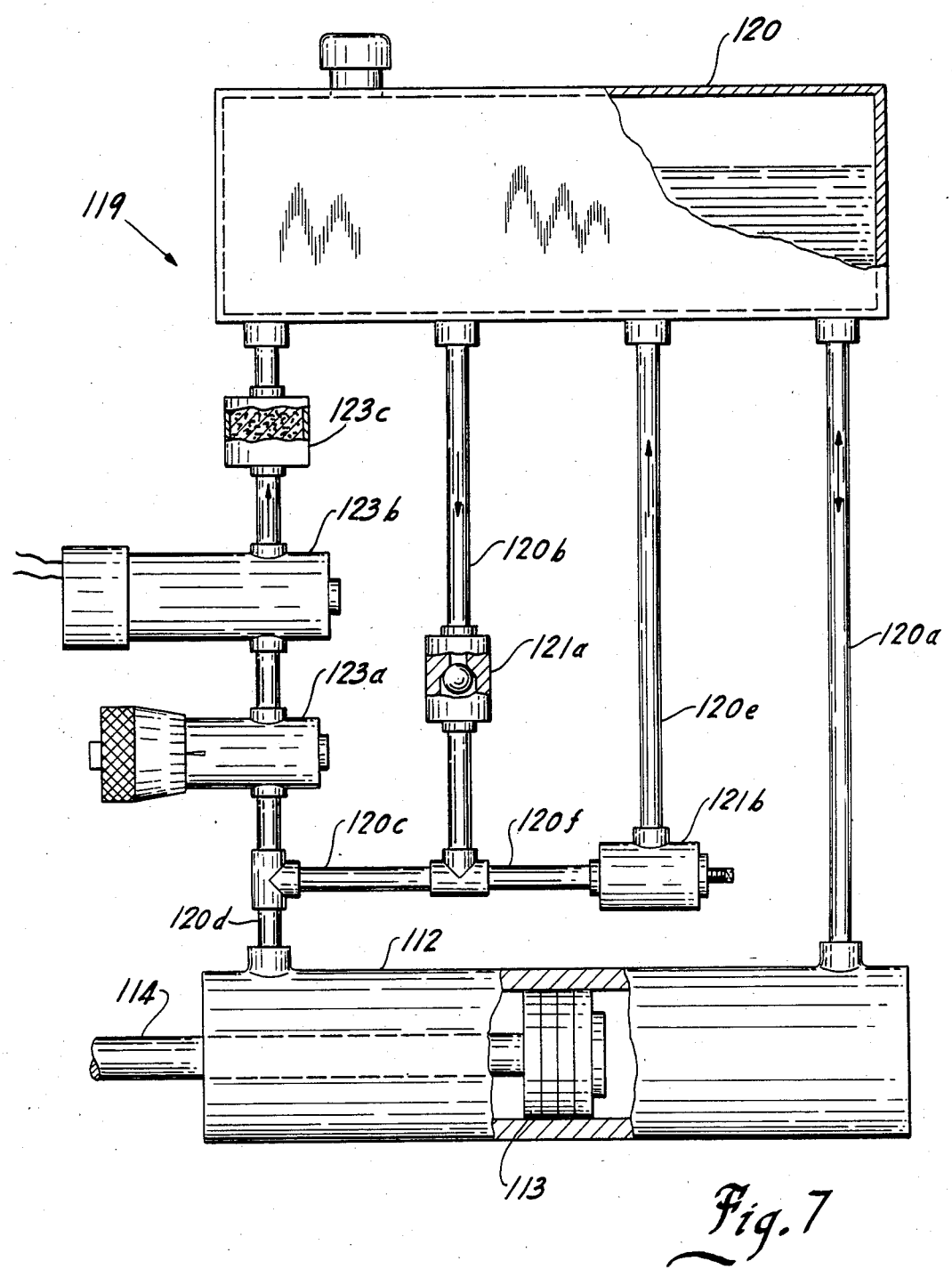
FIG. 7 schematically illustrates the tilting brake control for the trailer of FIG. 1.

As will be discussed more fully below, the trailer 10 is dumped by rearward movement of the prime mover (not shown). In order to hold the trailer 10 in its tilted position when rearward movement of the tractor ceases or as forward movement is attempted, a brake assembly 109 and a brake actuator assembly 110 are provided. As seen in FIGS. 1 and 7, the brake actuator assembly 110 includes a cylinder 112 disposed within the box beam 90. A piston 113 is located within the cylinder 112 and is coupled to one end of a push rod 114 extending axially within the box beam 90 and toward the arms 94. The brake assembly 109 includes a lever 116 pivotally connected to the other end of the push rod 114. The other end of lever 116 pivots around spindle 102. Mounted on the lever 116 adjacent to and engageable with the tracks 86 and 87 are pairs of brake shoes 118 disposed on the opposite sides of the rollers 103 and 104. The brake assembly 109 is set when force is exerted on lever 116 which forces the brake shoes 118 into engagement with the tracks 86 and 87.

The brake actuator assembly 110 also includes a control 119 mounted on beam 90 above cylinder 112 and having a reservoir 120 connected by a first conduit 120a to one end of cylinder 112 and by conduits 120b, 120c and 120d to the other end thereof. A check valve 121a is disposed in conduit 120b. A pressure relief valve 121b is connected by conduits 120e and 120f in a shunting relation to conduit 120b and check valve 121a. Also connected in a series path between reservoir 120 and the other end of cylinder 112 is a pressure compensated flow control valve 123a, a two-way solenoid-operated valve 123b and a filter 123c.

The wheels 16 and 17 at each side of the trailer 10 are rotatably mounted on spindles 125 and 126 fixed to the ends of arms 128 and 129, respectively. The opposite ends of the arms 128 and 129 are pivotally mounted on pins 131 and 132 which are received in a side by side relation in a bracket member 134 extending downwardly from the frame member 79. A strut 136 is connected between triangular brackets 137 mounted at the ends of arms 128 and 129 and extending downwardly therefrom. The strut 136 maintains the arms 128 and 129 in a predetermined angular relation to fix the relationship between the wheels 16 and 17 and the bed 21. If it is desired to change this relationship, the strut 136 is removed and the arms 128 and 129 rotated upwardly until a second pair of triangular brackets 139 on the opposite sides of arms 128 are spaced apart a distance equal to the length of the strut 136. When the arms are in this position, they will be angled upwardly from the horizontal at about the same angle as that shown in FIG. 1. The strut 136 can then be attached to brackets 139. It will be appreciated that this will lower the bed 21 relative to the wheels 16 and 17. Further adjustments in these heights can be achieved by either providing a strut 136 of adjustable length or struts of different lengths.

Also mounted on the beam 90 is a latch 140 which permits the tongue 90 to be locked in position relative to the main frame 14. Latch 140 includes a generally L-shaped latch member 142 which is pivotally mounted by means of a pin 144 extending between the sides of a bracket support 145 mounted on beam 90. A spring 146 engages a first leg 149 of latch 142 and urges the same counterclockwise around pivot 144 and against a stop 148. This places leg 147 in an abutting relation with the frame front cross piece 73. The other leg 150 of latch 142 is coupled by a bolt 152 to a solenoid 153. When the solenoid 153 is deenergized, the spring 146 holds the leg 147 of latch 142 in its abutting relation with the front cross piece 73 as shown in FIG. 1. As a result, the tongue 19 will be prevented from moving relative to the bed 12 upon rearward movement of the tractor. In order to release the latch 140, the solenoid 153 is energized to pivot the latch 142 clockwise and against the action of spring 146 thereby moving latch arm 149 out of engagement with the cross piece 73. When in this position, the tongue 19 is permitted to move rearwardly relative to the trailer bed 12.

Energy for the dumping operation is provided by the prime mover or tractor (not shown) without the requirement for any other hydraulic or electrical power systems. Thrust energy is imparted to the dumping trailer by backing the tractor while simultaneously applying brakes to the rear wheels 17. It will be appreciated that any conventional brake may be employed for the rear wheels 17 such as hydraulic, electrical, mechanical latching of the wheel 17 or the mechanical lowering of a chock which prevents the rear wheels 17 from turning. The dumping motion is terminated when rearward motion of the prime mover ceases. Engagement of the brake shoes 118 occurs automatically when rearward motion of the prime mover ceases and forward motion is attempted as will be discussed more fully below. Control of the dumping motion is derived from the tractor thrust wherein the operator of the tractor by varying the rate at which the tractor backs during the dumping operation controls the dumping rate.

As the tractor is backed and with the rear wheel 17 locked, the tongue 19 will begin moving rearwardly while the trailer 12 remains stationary. This results in the rollers 97 and 98 moving rearwardly and up the inclined tracks 81 and 82 while the rollers 103 and 104 also move rearwardly and down the inclined tracks 86 and 87. This causes the trailer to tilt upwardly from its position shown in FIG. 1 to its position shown in FIG. 3. The angle of tilt will be governed by the travel distance of the rollers 97, 98, 103 and 104 in their respective tracks. As this dumping action occurs, the rotational axis of the bed 12 moves rearwardly beneath the center of gravity of the load as the motion progresses. This reduces the effort and energy required for dumping. In addition, the relative travel of the tractor with respect to the trailer is quite large thereby resulting in a low thrust force.

With reference to FIG. 3, as the dumping action continues, the bed 12 begins pivoting around the axis of the rear wheel 17 whereby the rear gate 28 is lowered toward ground level. As a result, the rear edge of the bed 12 terminates its dumping motion only a few inches above ground level. Also, while the pivoting action continues, the rear gate 28 swings outwardly around the pivot pins 48 and 56 to the limit permitted by the chain 60. In this manner, the material disposed within the bed 12 is "metered" as the trailer is moved forwardly in its dumping mode. This "metering" is activated only by forward motion of the dump trailer since no flow occurs when the trailer is stopped even though the gate 28 is partially open and the trailer is in its dump mode as a result of the proximity of the rear end of the bed 12 to ground level. The thickness of metered material which is discharged from the bed 12 is controlled by the length of the chain 60. Also as a result of the reduced dumping energy, the dumping height requirement is minimized, or in other words, the head room requirement is low.

It can be seen by comparing the angular orientations of the lever 116 relative to the push rod 114 in FIGS. 1 and 3 that the push rod 114 is moved toward the cylinder 112 as the bed 12 pivots. When the piston 113 is moving forwardly, oil flows freely from one end of the cylinder 112 to reservoir 120 through conduit 120a and from the reservoir 120 to the opposite end of the cylinder 112 through conduits 120b, 120c and 120d and check valve 121a. When backward thrust of the prime mover ceases, the trailer bed 12 attempts to descend but return movement of the piston 113 is prevented by check valve 121a which prevents return oil flow. This increase in pressure on the rod 114 applies force to lever 116 pressing the brake shoes 118 against the tracks 86 and 87 which stops the trailer bed from descending. This action also retains the bed 12 at a constant attitude until reset.

Resetting the bed 12 to the hauling mode is essentially the reserve of the dumping procedure. In particular, the operator energizes the solenoid operated valve 123b to permit oil flow from the rod end of cylinder 112 to the reservoir 120. This permits the rod 114 to extend at a controlled rate permitting the bed 12 to reset smoothly. Any tendency of the bed 14 to move more swiftly is opposed by higher force in the piston 113 and rod 114 causing increased braking action thus slowing the bed motion to a predetermined rate. The head end of cylinder 112 is replenished with oil flowing freely through line 120a. If valve 123b is suddenly closed, relief valve 121b opens to relieve resulting shock pressure. When bed 12 reaches bottom, oil flow through flow control valve 123a ceases so that latch 140 automatically locks. The operator then deenergizes valve 123b and the reset operation is complete.

The illustrated braking mechanism also permits the bed 12 to be reset smoothly even if its load has not been fully discharged. This occurs as a result of the braking action of the piston 113 and the rod 114 acting on brake shoes 118 through lever 116.

Because the wheels are attached directly to the main frame 14, there is no requirement for a subframe typical of a conventional dump trailer. Further, because the tracks 81, 82 86 and 87 used for dumping the bed 12 are part of the main frame, no part of the dumping mechanism protrudes above the level of the bed 12 to permit fore and aft extensions of the bed 12 as when the front and rear gates are in their lowered position shown by broken lines in FIG. 1.

While only a single embodiment of the invention has been illustrated and described, it is not intended to be limited thereby but only by the scope of the appended claims.

We claim:

1. A dump trailer having a trailer bed and a frame affixed to and located below the bed, said frame having first track means which is inclined upwardly from front to rear and a second track means which is inclined downwardly from front to rear when the frame and said bed are in an untilted position, a towing tongue extending forwardly from said trailer and including means adjacent its forward end for attachment to a prime mover, wheels means rotatively mounted on said frame for supporting said trailer, first and second roller means mounted on said tongue and in spaced apart relation, said first roller means engaging said first track means and said second roller means engaging said second track means, said second roller means being at a higher elevation than the said first roller means when said bed and frame are in their untilted position, so that rearward movement of said tongue means when said wheel means are locked causes movement of said first roller means upwardly along said first track means and said second roller means downwardly along said second track means thereby tilting said frame and bed upwardly along the axis of said wheel means.

2. The dump trailer set forth in claim 1 wherein said first track means comprises a first pair of tracks disposed in a parallel spaced apart relation and on opposite sides of the center of said bed, said second track means comprises a second pair of tracks disposed in a parallel relation and between said first pair of tracks, said first roller means comprising a first pair of rollers respectively engaging said first pair of tracks and said second roller means comprising a second pair of rollers respectively engaging said second pair of tracks.

3. The dump trailer set forth in claim 2 wherein said tongue includes an elongated member and a first pair of arms extending from the rear end thereof, each of the rollers of said first pair being respectively mounted on the ends of said arms, second arm means extending upwardly from the rear end of said tongue, the rollers of the second pair being mounted on said second arm means.

4. The dump trailer set forth in claim 3 wherein said bed includes an open topped container, a gate for the rear of said container, a first pair of link means pivotally connected to the upper end of said gate and to the sides of the container inwardly of the rear end thereof and a second pair of link means pivotally connected to the lower end of said gate and to the sides of said container, and means for limiting the movement of the lower end of said gate away from the lower end of said container.

5. The dump trailer set forth in claim 4 and including brake means for locking said tongue to the frame to prevent return movement of said rollers along said tracks.

6. The dump trailer set forth in claim 5 wherein said brake means include cylinder means mounted on said tongue, brake shoe means mounted adjacent the rear end of said tongue and being in a position to engage at least one of said tracks, piston means disposed within said cylinder means, lever means engaging said piston means and said brake shoe means, movement of said tongue relative to said frame being operative to tilt said lever means whereby said piston means is moved toward one end of said cylinder means, and hydraulic circuit means interconnecting the ends of said cylinder means, and control means for controlling the flow rate of fluid between the opposite ends of said cylinder means whereby said lever means is engaged to lock said brake means when said trailer bed is urged by gravity toward its untilted position and until the hydraulic circuit means permits the return flow of hydraulic fluid to the other end of said cylinder means.

7. The dump trailer set forth in claim 6 wherein there are a pair of wheels comprised of front and rear wheels on opposite sides of said trailer, first and second arm means pivotally mounted at one end on said frame and extending, respectively, toward the front and the rear of said trailer, said front and rear wheels being rotatably mounted respectively at the ends of said first and second arm means, and strut means interconnecting the opposite ends of said arm means, said strut means being removable whereby said arm means may be pivoted through a vertica angle and said strut means reconnectable to change the elevation of said trailer bed relative to said wheels.

8. The dump trailer set forth in claim 1 wherein said bed includes an open topped container, a gate for the rear of said container, a first pair of link means pivotally connected to the upper end of said gate and to the sides of the container inwardly of the rear end thereof and a second pair of link means pivotally connected to the lower end of said gate and to the sides of said container, and means for limiting the movement of the lower end of said gate away from the lower end of said container.

9. The dump trailer set forth in claim 8 and including brake means for locking said tongue to the frame to prevent return movement of said rollers along said tracks.

10. The dump trailer set forth in claim 5 wherein said brake means include cylinder means mounted on said tongue, brake shoe means mounted adjacent the rear end of said tongue and being in a position to engage one of said tracks, piston means disposed within said cylinder means, lever means engaging said piston means and said brake shoe means, movement of said tongue relative to said frame being operative to tilt said lever means whereby said piston means is moved toward one end of said cylinder means, and hydraulic circuit means interconnecting the ends of said cylinder means, and control means for controlling the flow rate of fluid between the opposite ends of said cylinder means whereby said lever means is engaged to lock said brake means when said trailer bed is urged by gravity toward its untilted position and until the hydraulic circuit means permits the return flow of hydraulic fluid to the other end of said cylinder means.

11. The dump trailer set forth in claim 6 wherein there are a pair of wheels comprised of front and rear wheels on opposite sides of said trailer, first and second arm means pivotally mounted at one end on said frame and extending, respectively, toward the front and the rear of said trailer, said front and rear wheels being rotatably mounted respectively at the ends of said first and second arm means, and strut means interconnecting the opposite ends of said arm means, said strut means being removable whereby said arm means may be pivoted through a vertical angle and said strut means reconnectable to change the elevation of said trailer bed relative to said wheels.

12. A dump trailer having a trailer bed and a frame affixed to and located below the bed, said frame having first and second track means which extend from front to rear and define planes which intersect intermediate the ends of said trailer bed, at least one of said planes being inclined relatively to the horizontal when the frame means and said bed are in an untilted position, a towing tongue extending forwardly from said frame and including means adjacent its forward end for attachment to a prime mover, wheel means rotatively mounted on said frame for supporting said trailer, first and second roller means mounted on said tongue and in spaced apart relation, said first roller means engaging said first track means and said second roller means engaging said second track means, said second roller means being at a higher elevation than the said first roller means when said bed and frame are in their untilted position, so that rearward movement of said tongue means when said wheel means are locked causes movement of said first roller means along said first track means and said second roller means along said second track means and in said intersecting planes whereby said frame and bed are tilted upwardly along the axis of said wheel means.

13. The dump trailer set forth in claim 12 wherein said first track means comprises a first pair of tracks disposed in parallel spaced apart relation and on opposite sides of the center of said bed, said second track means comprises a second pair of tracks disposed in parallel relation and between said first pair of tracks, said first roller means comprising a first pair of rollers respectively engaging said first pair of tracks and said second roller means comprising a second pair of rollers respectively engaging said second pair of tracks.

14. The dump trailer set forth in claim 13 wherein said tongue includes an elongated member and a first pair of arms extending from the rear end thereof, the rollers of said first pair being respectively mounted on the ends of said first pair of arms, a second arm means extending upwardly from the rear end of said tongue, the rollers of the second pair being mounted on said second arm means.

15. The dump trailer set forth in claim 14 wherein said bed includes an open topped container, a gate for the rear of said container, a first pair of link means pivotally connected to the upper end of said gate and to the sides of the container inwardly of the rear end thereof and a second pair of link means pivotally connected to the lower end of said gate and to the sides of said container, and means for limiting the movement of the lower end of said gate away from the lower end of said container.

16. The dump trailer set forth in claim 15 and including brake means for locking said bed to the frame to prevent return movement of said rollers along said tracks.

17. The dump trailer set forth in claim 16 wherein there are a pair wheels comprised of of front and rear wheels on opposite sides of said trailer, first and second arm means pivotally mounted at one end on said frame and extending toward the front and the rear of said trailer, said front and rear wheels being rotatably mounted respectively at the ends of said first and second arm means, and strut means interconnecting the opposite ends of said arm means, said strut means being removable whereby said arm means may be pivoted through a vertical angle and said strut means reconnectable to change the elevation of said trailer bed relative to said wheels.

18. The dump trailer set forth in claim 15 including brake means for maintaining said bed in its tilted position, and control means for selectively releasing said brake means for controlled descent of said bed to its untilted position.

19. The dump trailer set forth in claim 18 wherein said brake means include a braking element operative when set to maintain said trailer in its tilted position, said control means including a hydraulic cylinder having a piston coupled to said tongue, hydraulic circuit means coupled to said cylinder and permitting free movement of said piston in one direction as said bed tilts, said hydraulic circuit means being operative to lock said piston against movement in the opposite direction, said tongue actuating said brake element when said piston is locked, and resetting means in said hydraulic circuit for releasing said piston for movement in an opposite direction at a controlled rate to release said brake element.

20. The dump trailer set forth in claim 19 and including a hydraulic reservoir, said hydraulic circuit means coupling said cylinder to said reservoir to permit said piston to move in a first direction, said hydraulic circuit blocking return flow from one end of said cylinder, a first hydraulic circuit element in said hydraulic circuit operative to couple the other end of said cylinder to said reservoir, and a second hydraulic circuit means for limiting the flow rate of fluid between the one end of said cylinder and said reservoir.

21. A dump trailer having a trailer bed and a frame fixed to and located below the bed, said frame having spaced apart inclined track means,
 a towing tongue extending forwardly from said trailer and including means adjacent one end for attachment to a prime mover,
 wheel means rotatably mounted on said frame for supporting said trailer,
 roller means mounted to said tongue adjacent the other end thereof and engaging said track means so that rearward movement of said tongue causes movement of said roller means along said track means whereby said frame and bed are tilted upwardly along the axis of said wheel means,
 brake means including brake elements mounted adjacent said roller means being operative to engage said frame to prevent pivotal movement of said bed,
 brake setting means including a hydraulic cylinder having a piston coupled to said towing tongue and freely movable in a first direction as said tongue moves rearwardly,
 hydraulic circuit means coupled to said cylinder operative to prevent return movement of said piston in an opposite direction whereby said brake means are set,
 and hydraulic circuit means operable to release said piston for return movement in said cylinder whereby said brake elements are released and said trailer is permitted to descend at a controlled rate.

* * * * *